US010229228B2

(12) United States Patent
Belmans et al.

(10) Patent No.: US 10,229,228 B2
(45) Date of Patent: Mar. 12, 2019

(54) SIMULATION OF AN ASSEMBLY OF FABRIC PIECES

(71) Applicant: Dassault Systemes, Velizy Villacoublay (FR)

(72) Inventors: Philippe Belmans, Paris (FR); Malika Boulkenafed, Courbevoie (FR)

(73) Assignee: Dassault Systemes, Velizy Villacoublay (FR)

( * ) Notice: Subject to any disclaimer, the term of this patent is extended or adjusted under 35 U.S.C. 154(b) by 765 days.

(21) Appl. No.: 14/288,329

(22) Filed: May 27, 2014

(65) Prior Publication Data
US 2014/0358495 A1  Dec. 4, 2014

(30) Foreign Application Priority Data
May 30, 2013  (EP) .................................. 13305711

(51) Int. Cl.
G06F 17/50 (2006.01)
G06T 17/00 (2006.01)

(52) U.S. Cl.
CPC ...... *G06F 17/5009* (2013.01); *G06F 17/5018* (2013.01); *G06T 17/00* (2013.01); *G06F 2217/16* (2013.01); *G06F 2217/32* (2013.01)

(58) Field of Classification Search
CPC ............. G06F 17/5009; G06F 17/5018; G06F 2217/16; G06F 2217/32; G06T 17/00
See application file for complete search history.

(56) References Cited

U.S. PATENT DOCUMENTS

| 2012/0218271 A1* | 8/2012 | Muller-Fischer ........................... G06F 17/5009 345/441 |
| 2012/0232854 A1* | 9/2012 | Muller-Fischer ........................... G06F 17/5009 703/1 |
| 2012/0253756 A1* | 10/2012 | Favier ................. G06F 17/5009 703/2 |

OTHER PUBLICATIONS (Robert Bridson et al., Robust Treatment of Collisions, Contact and Friction for Cloth Animation, 2002, Association for Computing Machinery, Inc., 594-603).*
(Moon Koo Kang et al., A real-time cloth draping simulation algorithm using conjugate harmonic functions, Sep. 2006, Elsevier Ltd., Computers & Graphics 31 (2007) 271-279).*
(Marzia Fontana et al., A CAD-oriented cloth simulation system with stable and efficient ODE solution, 2006, Elsevier Ltd., Computers & Graphics 30 (2006) 391-406).*
Thomaszewski, et al., "Physically Based Simulation of Cloth on Distributed Memory Architectures", *Parallel Computing*, 33(6) (May 19, 2007).
Bender, Jan, et al., "Parallel Simulation of Inextensible Cloth", Workshop in Virtual Reality Interactions and Physical Simulation "VRIPHYS" pp. 47-55 (Jan. 1, 2008).

(Continued)

*Primary Examiner* — Aniss Chad
*Assistant Examiner* — Justin C Mikowski
(74) *Attorney, Agent, or Firm* — Hamilton, Brook, Smith & Reynolds, P.C.

(57) ABSTRACT

A computer-implemented method for simulating an assembly of fabric pieces can include providing a plurality of parallel solvers, a first solver simulating at least one first fabric piece and a second solver simulating at least one second fabric piece. The computer-implemented method can further include maintaining the first and the second fabric pieces tight by computing a common frontier by the first and second solvers.

20 Claims, 6 Drawing Sheets

(56) References Cited

OTHER PUBLICATIONS

Zara, F. et al., "Parallel Simulation of Large Dynamic Systems on a PC Cluster: Application of Cloth Simulation", International Journal of Computers and Applications 26(3) (Jan. 1, 2004).
European Search Report and Written Opinion for EP 13 30 5711 dated Oct. 8, 2013.

* cited by examiner

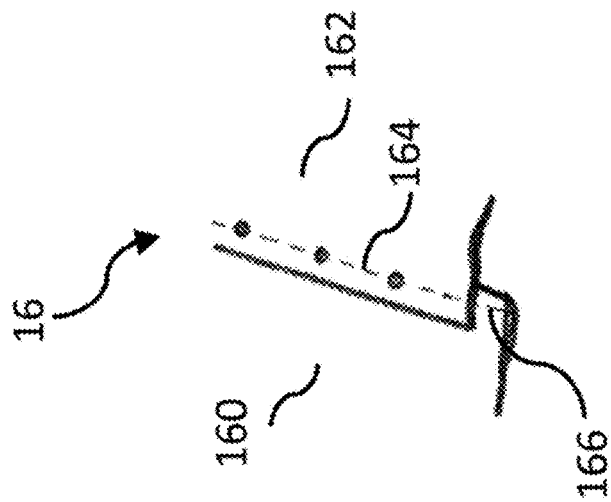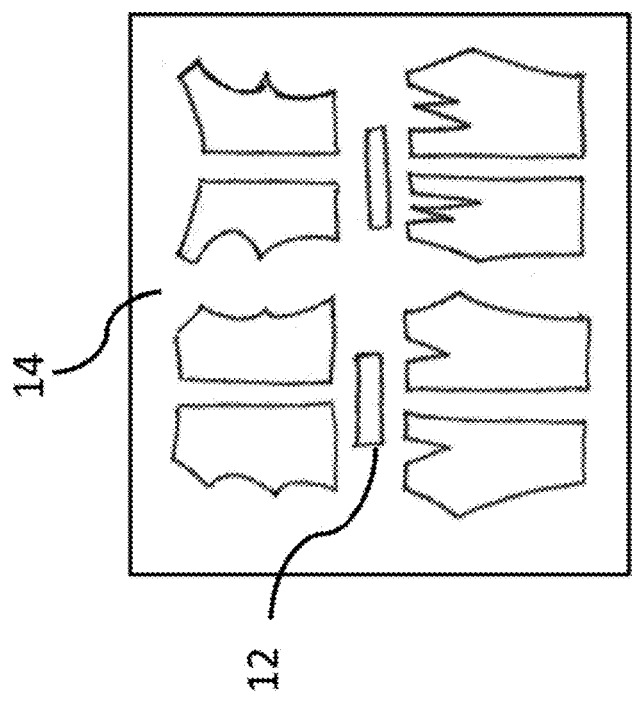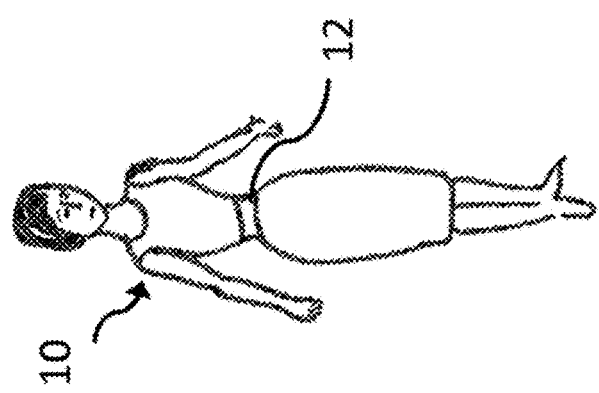

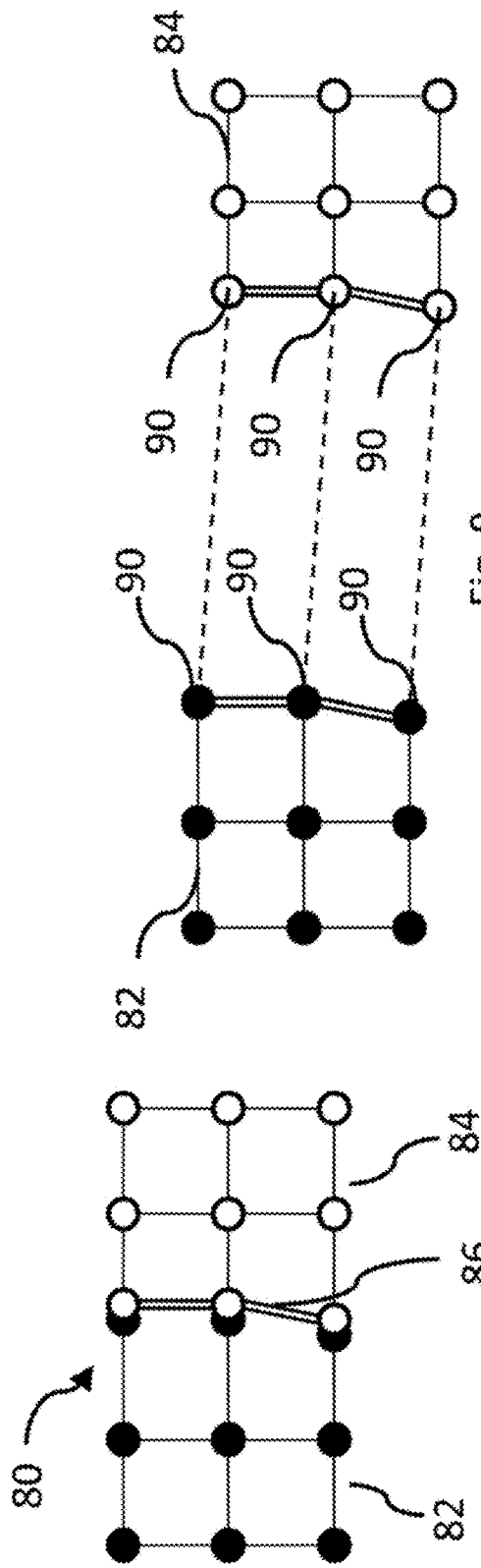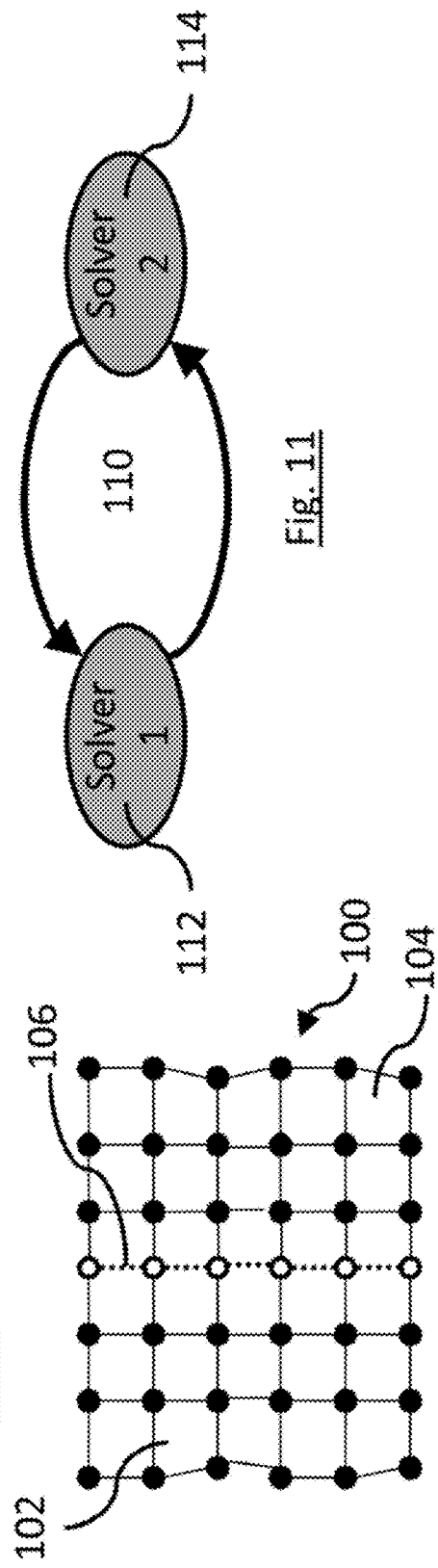
Fig. 8
Fig. 9
Fig. 10
Fig. 11

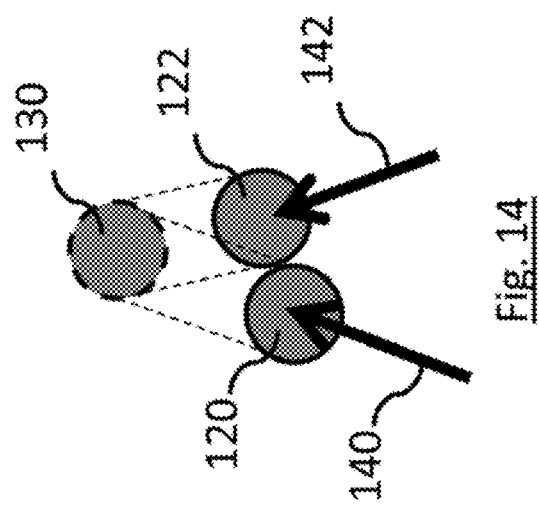
Fig. 14
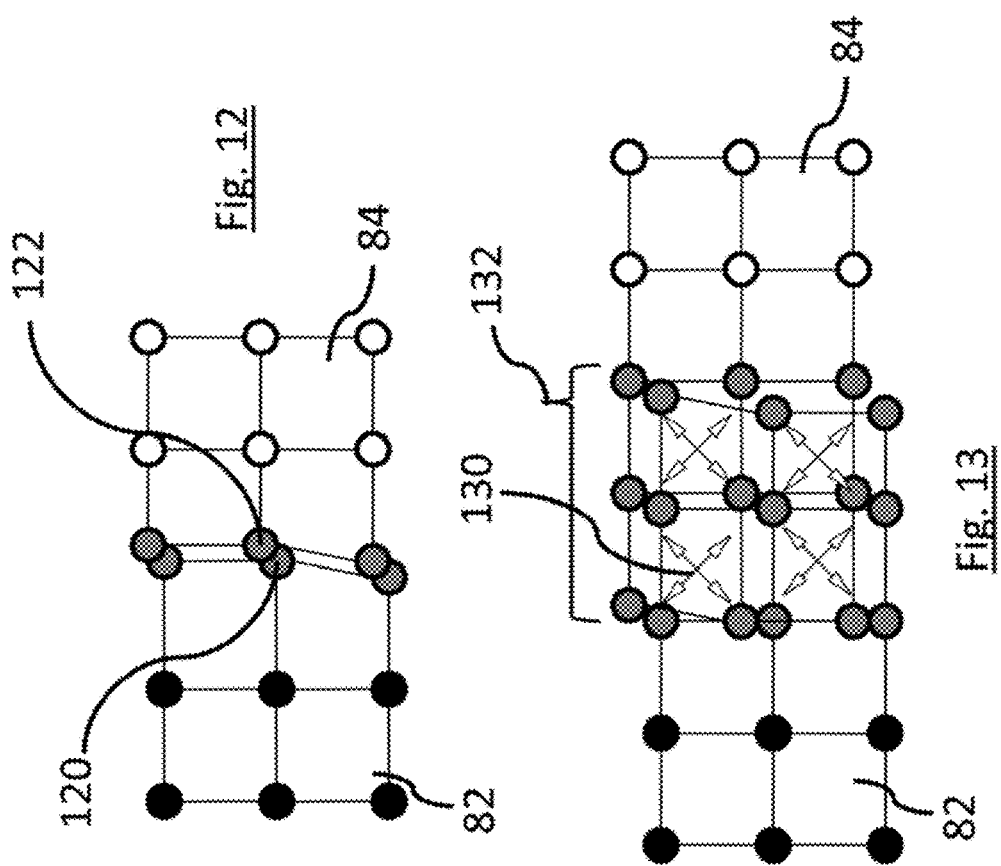
Fig. 12
Fig. 13

SIMULATION OF AN ASSEMBLY OF FABRIC PIECES

RELATED APPLICATION(S)

This application claims priority under 35 U.S.C. § 119 or 365 to European Application No. 13305711.7, filed May 30, 2013. The entire teachings of the above application(s) are incorporated herein by reference.

FIELD OF THE INVENTION

The invention relates to the field of computer programs and systems, and more specifically to computer-implemented method, computer program and system for simulating an assembly of fabric pieces, to a 3D modeled object obtainable by said method, to a data file storing said 3D modeled object.

BACKGROUND OF THE INVENTION

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Fashion industry interest has grown tremendously for CAD tools. A first concern deals with the optimization of the manufacturing of apparels e.g. in order to reduce fabrics scrap, minimize cycle times). A second concern deals with the simulation of the aspect of garments. Indeed, it can be necessary to obtain the most realistic aspect of the rendering of a garment, in terms of texture and light with a great level of detail to help the stylist in the creation process.

Furthermore, the need for visual accuracy in realism may be not so demanding, but the virtual experience has to give the same visual feeling that the garment will produce in real life and particularly when motion is involved. Such real-time experience includes virtual try-out, virtual fashion show, and choreography in performing arts, where the realism is the ultimate achievement that needs to be guaranteed by simulation.

However, the limits are rapidly met: the garment may be too complex for real-time, or the number of objects to simulate can be too massive.

A first solution to this problem consists in dividing the garment into smaller domains, which are solved in parallel. This is quite a classical method in the field of Structural Analysis with Finite Elements Method (FEM). A structure is decomposed into several sub-structures called domains; the decomposition is based on mesh geometrical properties without any additional constraints. The different domains are solved in parallel, either the solver architecture is multi-threaded (but this not fully scalable), or several servers run in parallel. This is however not applicable for real-time simulation: indeed, the need of accuracy and coherence on the frontiers of domain requires coupling procedures, where solvers iterate to converge consistently and typically take hours to simulate few seconds of real phenomena.

Massively Multiplayer Online Games (MMOGs) cope successfully with massiveness, thanks to an approach called Zoning. The virtual universe is partitioned into so called zones running in parallel. But the frontier between two zones isolates the two zones with one another. For that reason, objects are teleported from a zone to a second one at best with a minimal state continuity, but no zone to zone interaction is possible. Assuming a piece of fabrics is zoned like this, the resulting effect would be unrealistic.

Hence, on-line experience with complex garments and massiveness constraint cannot be managed in a scalable way because traditional scalable approaches are far from being real-time (e.g. FEM), or are not realistic in physical behavior (e.g. Zoning).

Within this context, there is still a need for an improved simulation an assembly of fabric pieces.

SUMMARY OF THE INVENTION

According to one aspect, the invention therefore provides a computer-implemented method for simulating an assembly of fabric pieces. The method comprises:

providing a plurality of parallel solvers, a first solver simulating at least one first fabric piece and a second solver simulating at least one second fabric piece; and maintaining the first and the second fabric pieces tight by computing a common frontier by the first and second solvers.

The method may comprise one or more of the following:

the computation of the common frontier is performed by combining data of the first fabric piece and data of the second fabric piece;

the combination of data of the first fabric piece and the second fabric piece is performed by mutually exchanging data between the first solver and the second solver;

the mutual exchange of data between the first solver and the second solver comprises:

the first solver computes a first local prediction of common frontier data from current common frontier data, and sends the result of the computation to the second solver;

the second solver computes a second local prediction of common frontier data from current common frontier data, and sends the result of the computation to the first solver;

the first solver receives the second local prediction sent by the second solver;

the second solver receives the first local prediction sent by the first solver;

the first solver combines the first local prediction of the common frontier data with the received second local prediction of the common frontier data, the result of the combination being a global common frontier prediction data;

the second solver combines the second local prediction of the common frontier data with the received first local prediction of the common frontier data, the result of the combination being the global common frontier prediction data;

the first solver computes a first corrective force to apply on common frontier, the first corrective force being computed from current local common frontier data and the global common frontier prediction data; and the second solver computes a second corrective force to apply on common frontier, the second corrective force being computed from current local common frontier data and the global common frontier prediction data;

the first solver inputs the computed first corrective force to the common frontier and obtains a new current common frontier data, the second solver inputs the computed second corrective force to the common frontier and obtains a new current common frontier data;

combining a local prediction of the common frontier data with a received local prediction of the common frontier data is performed by averaging values representative of the local prediction with values representative of received local prediction;

the at least one first and second fabric pieces are modeled by surfaces meshes comprising nodes;

the common frontier data are related to the position and/or the velocity of the nodes of the first and second fabric pieces that are part of the common frontier between the at least one first and second fabric pieces;

the first solver is dedicated to a first type of fabric piece and the second solver is dedicated to a second type of fabric piece.

The invention further proposes a computer program comprising instructions for execution by a computer, the instructions comprising means for performing the above method.

The invention further proposes a computer readable storage medium having recorded thereon the above computer program.

The invention further proposes a computer system for simulating an assembly of fabric pieces, comprising a processor coupled to a memory, a graphical user interface for displaying the simulation the assembly of fabric pieces, the memory having recorded thereon the above computer program.

The invention further proposes a three-dimensional modeled object obtainable by the above method.

The invention further proposes a data file storing the above three-dimensional modeled object.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention will now be described, by way of non-limiting example, and in reference to the accompanying drawings, where:

FIGS. 1 to 3 show an example of an assembly of fabric pieces.

FIGS. 8 to 10 show an example of partitioned surface meshes to model garment.

FIG. 11 shows an example of exchanges between solvers, each solver simulating at least one fabric piece.

FIGS. 12 to 14 show an example of common frontier computations for recreating the effects of actual seams of the sewing pattern of an assembly of fabric pieces.

DETAILED DESCRIPTION OF THE INVENTION

Figure 5:
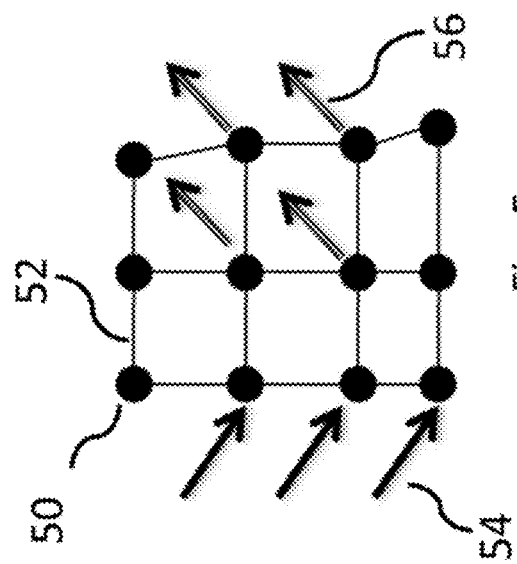
FIGS. 4 to 7 show an example of surface meshes to model an assembly of fabric pieces.
Figure 7:
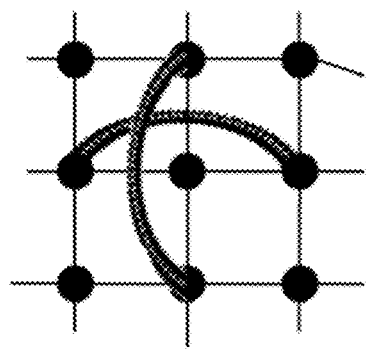

A description of example embodiments of the invention follows.

The teachings of all patents, published applications and references cited herein are incorporated by reference in their entirety.

It is proposed a computer-implemented method for simulating an assembly of fabric pieces. The term simulation means that a new state of the assembly is obtained from a current state of the assembly. In practice, the simulation computes the state of the assembly at time $T+\Delta t$ from the state of the assembly at time T. The state of the assembly means a set of values of parameters defining the assembly at a given time of the simulation. The method comprises providing a plurality of parallel solvers. A solver is module dedicated to a particular computation. For instance, a solver may be a stand-alone computer program or a software library. A first solver simulates at least one first fabric piece and a second solver simulates at least one second fabric piece. The first and second fabric pieces belong to an assembly of fabric piece that typically models a garment. The method also comprises maintaining the first and the second fabric pieces tight by computing a common frontier by the first and second solvers. The computing is performed by the first and second solver. Maintaining tight means that the two fabric pieces are joined. The common frontier comprises a part of the first fabric piece and a part of the second fabric piece. For instance, the common frontier may be a seam between the two fabric pieces that belong to a simulated garment.

Such a method improves the real time simulation of garment made of an assembly of fabric pieces. Indeed, the proposed solution takes advantage of the fact that a garment is made of several pieces of fabric, shaped according to common frontiers between the fabric pieces, e.g. a sewing pattern that gives a natural partitioning of a garment. Hence, the present invention allows obtaining a realistic visual rendering of garment, and the rendering conforms to what the garment would be if real and attention is taken for aspect of folds, of wrinkles, of seams, of complex fabrics textures. In addition, the computing of the common frontier is performed by each solver involved with the fabric piece that belongs to the common frontier: hence, a parallel computation of each solver can be performed for computing the common frontier. As a result, the simulation of the assembly of fabric pieces can be performed in real time because it is possible to use in parallel the computing resources of each solver. Hence, the present method improve the scalability of the simulation of an assembly of fabric pieces because when a complex garment cannot be simulated properly, either because it represents a too big volume of data to handle, or because it cannot be solved in real-time, this approach makes it possible with a sufficient and straightforward partitioning of the garment within a clique of solvers, in conjunction with the computation of the common frontier under the responsibility of the solvers. The realism of the result of the simulation is therefore enhanced. In addition, the present invention advantageously allow to simulate a garment made of an assembly of fabric pieces made of different materials because each fabric piece may be simulated by a dedicated solver that is adapted to simulate a particular material. Moreover, computing of the common frontier by each solver involved with the fabric piece that belongs to the common frontier further allow to simulate seam with a proper mechanical behavior, e.g. a zipper binding the common frontier. Additionally, the present invention allows to optimize dynamically CPU workload by using a load balancing scheme that takes advantage of the solvers; for instance, workload of the solvers may be easily balanced across multiple computers.

The method is computer-implemented. This means that the steps (or substantially all the steps) of the method are executed by at least one computer. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

A typical example of computer-implementation of the method is to perform the method with a system comprising a graphical user interface (GUI) suitable for this purpose. The GUI is coupled with a memory and a processor. The memory, which stores a database, is merely any hardware suitable for such storage. Such a system improves the realism and the scalability of the simulation in real time of a garment made of an assembly of fabric pieces.

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, the fabric pieces may be stored on a database as well as the assembly of fabric pieces.

The method generally manipulates fabric pieces. A fabric piece is a modeled object, typically a 3D modeled object. A modeled object is any object defined/described by structured data that may be stored in a data file (i.e. a piece of computer data having a specific format) and/or on a memory of a computer system. By extension, the expression "modeled object" designates the data itself. According to the type of the system, the modeled objects may be defined by different kinds of data. The system may indeed be any combination of a CAD system, a CAE system, a CAM system, and/or a PLM system. In those different systems, modeled objects are defined by corresponding data. One may accordingly speak of CAD object, PLM object, CAE object, CAM object, CAD data, PLM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

The method may be part of a method for designing the 3D modeled object, e.g. the method constituting the ending steps of such a designing method. "Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The 3D modeled object may be a CAD modeled object or a part of a CAD modeled object. In any case, the assembly of fabric pieces simulated by the method may represent a CAD modeled object or at least part of it. A CAD modeled object is any object defined by data stored in a memory of a CAD system. According to the type of the system, the modeled objects may be defined by different kinds of data.

By CAD system, it is meant any system suitable at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round etc.) and/or standard surfacing features (e.g. sweep, blend, loft, fill, deform, smoothing and/or etc.). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is meant any system suitable for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

By CAE system, it is meant any system suitable for the analysis of the physical behaviour of a modeled object. In a CAE system, a modeled object is thus defined by data suitable for the analysis of such behaviour. This may be typically a set of behavioring features. For instance, a modeled object corresponding to a door may be defined by data indicating that the door rotates around an axis.

Figure 16:
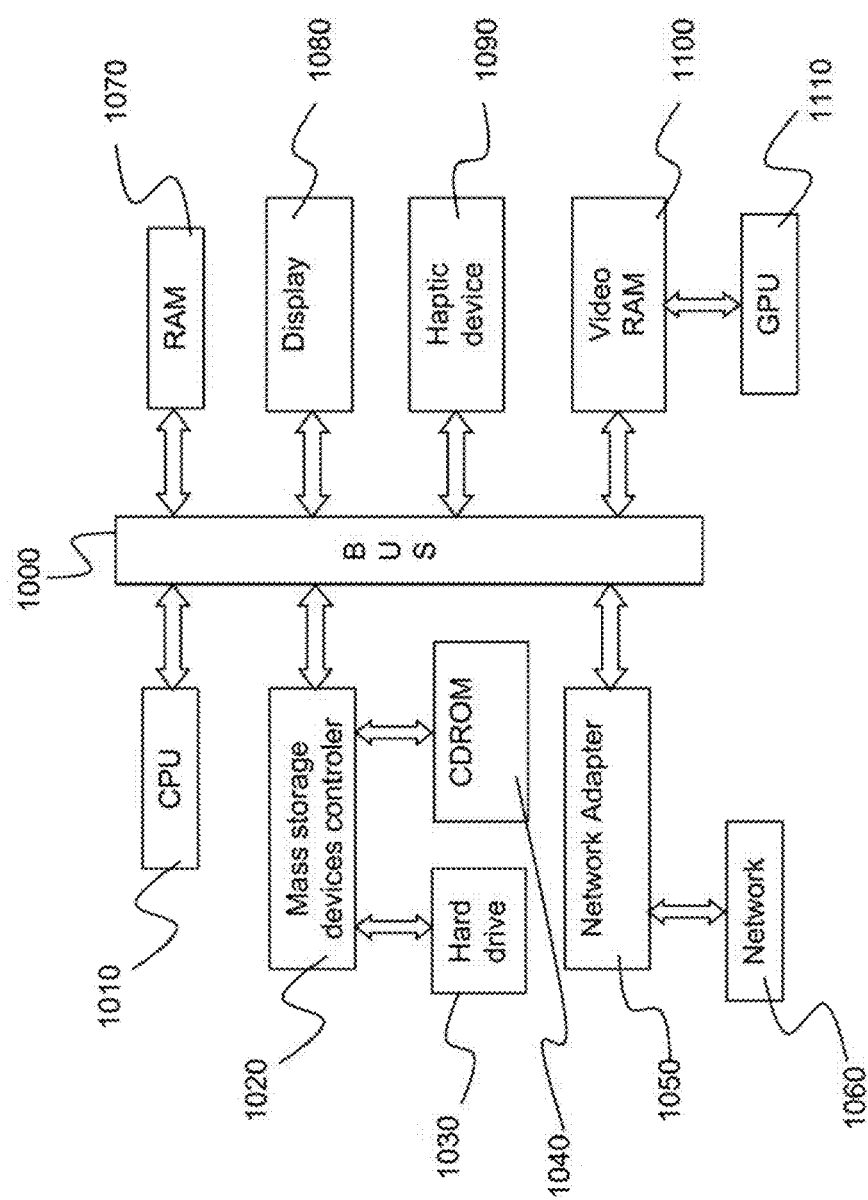
FIG. 16 shows an example of computer system for simulating an assembly of fabric pieces.

FIG. 16 shows an example of a computer system for simulating an assembly of fabric pieces. The computer system may be, but not limited to, a computer-aided design system, a tablet, a smartphone . . . . The depicted computer system comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on a display 1080. In practice the display may display a graphical user interface for displaying the simulation the assembly of fabric pieces. The display may be, but not limited to, a screen, a touch sensitive screen . . . . In addition, the cursor control device allows the user to select various commands, and input control signals. The cursor control device includes a number of signal generation devices for input control signals to system. Typically, a cursor control device may be a mouse wherein the button of the mouse is used to generate the signals, a sensitive touch screen that is also used to generate the signals.

A computer program may comprise instructions by a computer, the instructions comprising means for causing the above system to perform the above method. The invention may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

The method outputs a simulated assembly of fabric pieces wherein the fabric pieces are keep maintained by at least two solvers. Notably, the simulation includes a common frontier that is computed by at least two solvers, wherein the common frontier may be typically a seam between the two fabric pieces. Hence, the simulation takes advantages of the structure (e.g. the seams) of the assembly to be simulated and relies on collaboration between the solvers, which improves the simulation speed and the scalability. Such a simulation of an assembly of fabric pieces allows a realistic simulation in real time.

Referring now to FIGS. 1 to 3, an example of an assembly of fabric pieces is illustrated.

On FIG. 1, a garment (the dress 10) is an assembly of several pieces of fabrics, for instance the fabric piece 12.

FIG. 2 shows the pieces of fabrics of the garment illustrated on FIG. 1 that are cut and shaped according to sewing pattern, which is the flat planar layout 14 of all its constituting parts. The sewing pattern is thus the templates from which the parts (or fabric pieces) of a garment are traced onto fabric before cutting out and assembling.

FIG. 3 depicts a seam 16 that maintains tight two fabric pieces 160 and 162 of the assembly of FIGS. 1 and 2. The two fabric pieces are joined by sewing in coincidence two curves 164 and 166, each of them being drawn on a fabric piece. The two fabric pieces are joined along a common frontier which is obtained by placing the fabric piece 162 beside the fabric piece 160 while maintaining the coincidence of the two curves 164 and 166. Hence, the common frontier comprises a part of first fabric piece 160 and a part of the second fabric piece 162.

Referring now to FIGS. 4 to 7, it is shown an example of a surface mesh to model a fabric piece of an assembly of fabric pieces.

Figure 4:
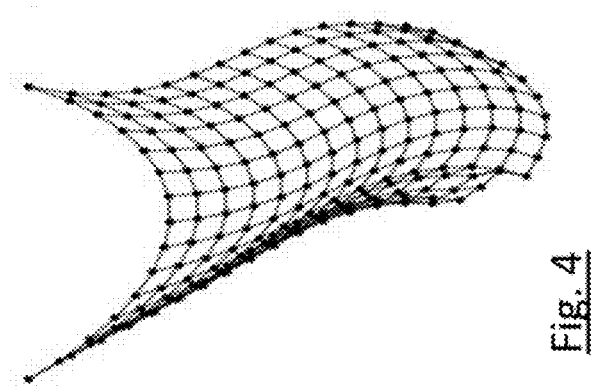
Figure 6:
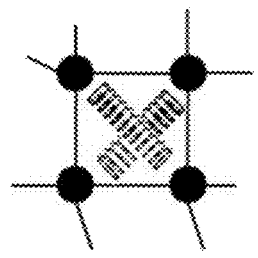

FIG. 4 shows an example of a surface mesh used by a solver to model a fabric piece and to compute the motion of the fabric piece.

FIG. 5 shows details of the surface mesh of FIG. 4. The mesh contains a myriad of nodes 50, which are connected with one another by edges 52. In practice, two nodes are mechanically connected in order to simulate the mechanical properties of the fabric piece. The nodes connections may form a network of convex quadrangles, as shown on FIG. 5. It is to be understood that other structure may be used, e.g. a triangle structure. More generally, a polygon mesh is a collection of vertices, edges and faces that defines the shape of an object, here a fabric piece.

Figure 15:
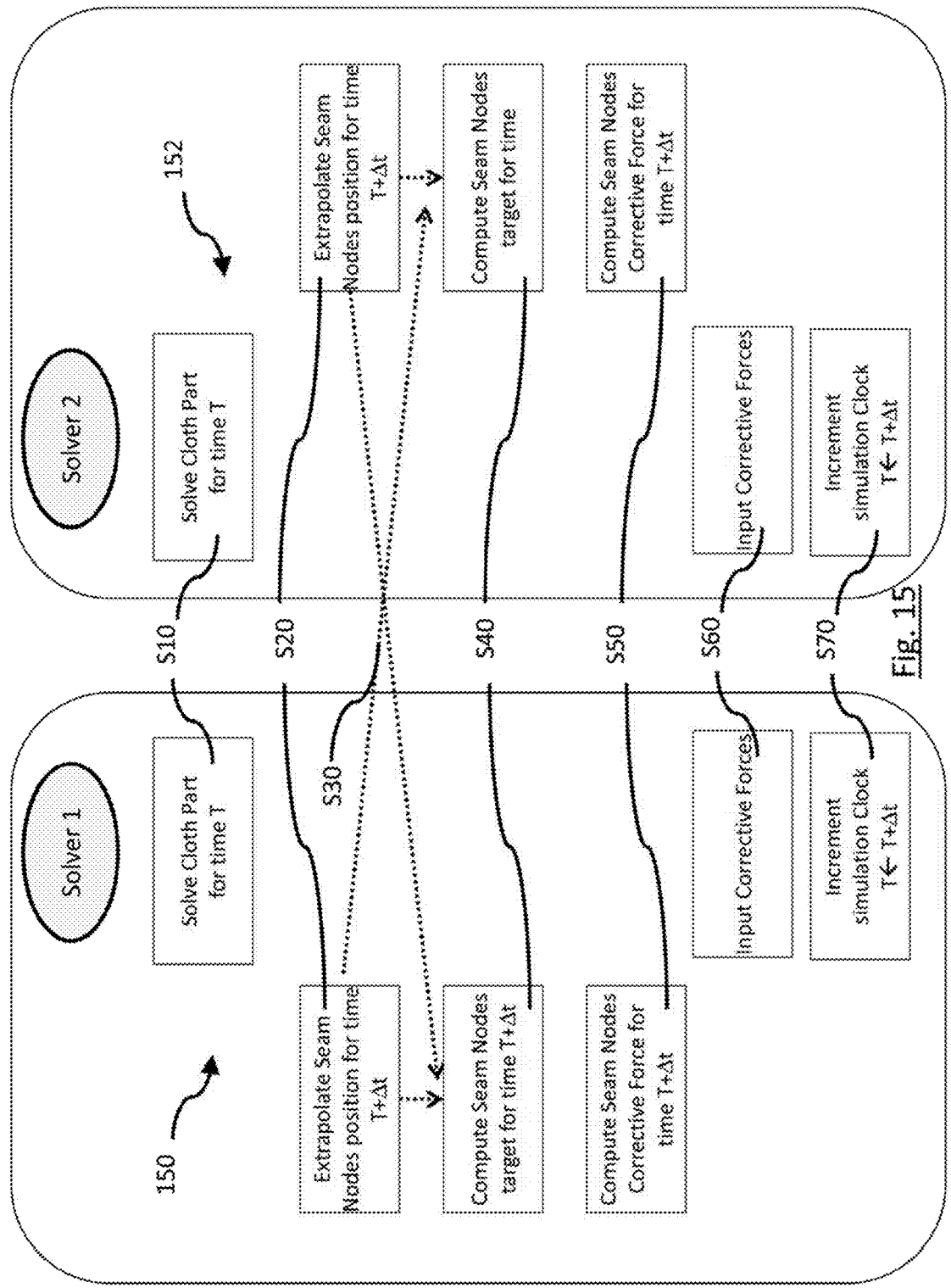
FIG. 15 shows a flowchart of an example of the method.

Referring now to FIG. 15, an example of the method according to the invention is shown. In this example, it is provided two parallel solvers, namely solver 1 and solver 2. Providing a solver means that the solver is available to the computer system performing the invention, e.g. the solver can be executed by the computer system.

The solver may solve equations of dynamics applied to mesh nodes that are considered as punctual masses. The solver thus determines the motion of the nodes as a solution, and therefore the shape of fabric piece versus time. Several features of the mesh that models the fabric piece may be controlled by the fabric piece's solver through the Application Programmable Interface (API) of the solver. In particular, the solver may control dynamic inputs and dynamic outputs of the mesh modelling the fabric piece. Dynamic input aims at exerting forces on all nodes (e.g. for simulating the gravity) or a subset of nodes (e.g. for simulating wind, contacts with solids . . . ) and/or imposing positional constraints (e.g. pinned on a wall, e.g. hanging on a coat hanger . . . ). Dynamic inputs are represented by arrows 54 on FIG. 5.

Dynamic output comprises the position and velocity of each node of the mesh. The position and the velocity are crucial to animate the modeled fabric piece. Additional dynamic output may consist of normal vectors and texture data which are post-processed by the solver mostly intended for texture rendering in the visualization process. Dynamic outputs are represented by arrows 56 on FIG. 5.

The fabric piece models may be characterized by mass and spring parameters. This is illustrated on FIGS. 6 and 7 wherein vertex arrangements behave like links imposing constrained relative mobility between nodes and inducing locally shearing and bending efforts within the mesh. With shearing, fabric piece tends to shrink/expand in its tangent plane due to diagonal springs illustrated on FIG. 6, while with bending the fabric piece tends to incurve due to hinge springs illustrated on FIG. 7.

The two provided solver may be the identical or they may be different. In any case, each solver of the provided plurality of solvers is able to take as input the output of another solver.

The first solver may be dedicated to a first type of fabric piece and the second one may be dedicated to a second type of fabric piece. By type of fabric piece is understood the matter of the fabric piece such as natural (e.g. wool, flax, cotton) or artificial fibers, how the fibers of the fabric piece are formed (e.g. weaving, knitting, crocheting, knotting, or pressing fibers together). This advantageously allows to perform the simulation of an assembly of fabric pieces made of different types.

Each solver of the plurality of parallel solver is responsible for simulating at least one fabric piece. The number of fabric pieces simulated by a solver will depends on characteristics of the assembly of fabric pieces, at it is now discussed in reference to FIGS. 8 to 9.

In FIG. 8, the mesh 80 modeling a garment is partitioned, into as many fabric pieces 82, 84 as necessary, each of them being handled by a dedicated solver running on its own computing resource free from size or time issue. The mesh modeling the garment has too many nodes to be handled by a single solver, either because of the volume of data cannot be managed by the solver, or because this volume of data cannot be computed in real-time.

In practice, the partitioning of the mesh of the garment may be performed in accordance with the sewing pattern 86, as discussed in reference to FIG. 2. In this case, at least one fabric piece is simulated by a solver.

The computing resource attributed to the solver may run below its nominal capacity. In this case, it is possible to attach one or more supplementary fabric piece on the same solver to get fairer loads. Hence, several fabric pieces are simulated by the solver. In addition, the physical behavior of the fabric pieces that are simulated by the solver can be managed locally by the solver with the desired and affordable degree of sophistication. One understands that several strategies of workload distribution between solvers may be implemented.

The computing resource attributed to the solver may not cope with a fabric piece that is too heavy for its solver. This is for instance the case with a garment made of large fabric pieces. In this case, the fabric piece may be divided in as many sub-parts as necessary on as many solvers, creating "virtual seam" that must have a "seamless" behavior during simulation. The term virtual seam means a seam that is not part of the initial sewing pattern, and the term seamless behavior means that the virtual seam does not modify the result of the simulation compared with a simulation of the undivided fabric piece. Division of a fabric piece is illustrated on FIG. 10 wherein the mesh 100 is divided into two sub parts 102 and 104 that are maintained tight along a common frontier 106, which is in this example a virtual seam. It is to be understood that the common frontier between two fabric pieces will comprise at least one node of the first and second fabric pieces.

Global simulation of all fabric pieces, of all sub parts running each on their solvers in parallel, provides ideally similar results than simulation of the whole parts on the ideal solver (with unlimited memory), despite of real or virtual seams. The first and second fabric pieces are maintained tight by use of a so called common frontier computation 110 depicted on FIG. 11 wherein the both solvers 112 and 114 are supervised in order to restitute the global behavior of the simulation. Both solver made their own computation and interact on each other in order to restitute the global behavior of the simulation. The common frontier computation advantageously recreates the effect of real seams of the sewing pattern and, when required for load balancing, virtual seams that must have a seamless behavior during simulation. The common frontier computation thus aims at providing a corrective force which is determined according to a predetermined relation between two paired nodes.

For instance, FIG. 9 shows paired nodes wherein exact coincidences of positions and velocities of the paired nodes 90 of both sawn fabric pieces 82 and 84 are computed separately—the solver 112 performing the computation for the fabric piece 82 and the solver 114 performing the computation for the fabric piece 84. The paired seam nodes 90 are shown with dashed strokes. Hence, the solvers 112 and 114 compute a common frontier between the parts 82 and 84 in order to maintain tight the fabric pieces 82 and 84, and the common frontier comprises paired nodes of the fabric pieces 82 and 84.

In practice, the computation of the common frontier may be performed by combining data of the first and second fabric pieces. The data may be related to the position and velocity of each pair noted. The combination may performed by mutually exchanging data between the first solver and the second solver.

Referring now to FIGS. 12 to 14, it is shown how two solvers maintain tight two fabric pieces, that is, how the common frontier between the two fabric pieces is computer by the two solvers. As illustrated on FIG. 12, the ideal seam model actually acts as if the fabric piece 82, 84 were seamless, only transmitting forces and torques and not allowing any relative mobility between paired nodes 120 computed on the first solver and 122 computed on the second solver. In this case, the paired nodes 120, 122 have exactly same position and same velocity on both solvers at any time.

In practice, this ideal seam model is difficult to be obtained and it is almost impossible that both solvers compute on their own exactly the same values, for multiple reasons: numerical truncation, approximation, different solvers iteration cycle. As part of the common frontier computation, as illustrated on FIG. 14, for each paired node 120, 122, each solver outputs current position and/or velocity data of paired node 120, 122 and mutually agree, by appropriate data exchange, to reach a common position target 130 for next time-step of simulation. From this common position target 130, a corrective force 140, 142 can be computed for each solver, as input to apply on node 120, 122, so as to reach common position target 130. The computation of the common frontier is thus carried out by combining data of the first fabric piece and data of the second fabric piece so that a common position target can be obtained.

For a more realistic and elaborate seam model, with bending, shearing, folding, corrective force can computed with a more complex common frontier such as a lattice structure. This is for instance illustrated on FIG. 13 wherein the lattice structure 132 embodies spring relationships 130 on positions and/or velocities linking adjacent nodes on same fabric piece mesh or on each fabric piece part mesh. In this case, the common frontier comprises the lattice structure 132. It is to be understood that many patterns can be implemented depending on mechanical properties of fabric pieces, on wanted mechanical behavior for the common frontier and on resulting visual aspect.

Referring back to FIG. 15, it is to be understood that two parallel solvers have been provided and that each solver simulates at least one fabric piece. It is to be understood that the at least one fabric piece simulated by the solver is also provided, that is, it is available to the computer system performing the simulation. The expression parallel solver means that both solvers perform parallel computing, that is, calculations of each solver are carried out simultaneously, or at least during a predetermined period of time. This means that the parallel solvers are synchronized, e.g. synchronized with a simulation clock. It is to be understood that two solvers cannot simulate the same piece of fabric.

Once the providing step has been performed, a step of maintaining tight the first and second fabric piece is carried out by computing the common frontier between fabric pieces. It is the main constraint of real-time that computation cycle, which includes the maintaining step is strictly time bounded, to guaranty delivery of animation snapshot on time for the simulation. The computation of the common frontier is therefore based on one shot data exchange between solvers, free of any iteration.

At step S10, each solver computes current common frontier data. The term current common frontier data means information defining the state of the common frontier at a given point in time. In practice, each solver evaluates the position and/or the velocity of each node of the fabric piece that belongs the common frontier. It is to be understood that the solver only performs this evaluation for the nodes of the fabric piece that it manages. The step 10 is typically performed at simulation clock time T.

Next, at step S20, each solver computes a local prediction of the common frontier data. This prediction is typically performed from the current common frontier data obtained at step S10. In practice, the common frontier data is values representing the position and/or the velocity of each node of the fabric piece that belongs the common frontier, and the local prediction is predicted values representing the predicted position and/or the velocity of each node of the fabric piece that belongs the common frontier. The prediction is performed as known in the art. For instance, the prediction may be a linear prediction that is an operation where future values are estimated as a linear function of values. As another example, the prediction may be a dead reckoning in navigation that is the process of calculating one's current position by using a previously determined position and advancing that position based upon known or estimated speeds over elapsed time, and course. The node position and/or velocity of the common frontier are extrapolated. The prediction or extrapolation is performed for the next clock time T←T+Δt, the current clock time being T.

Then, at step S30, each solver sends the result of the computed prediction to the other solver. This amounts to say the first solver receives the second local prediction sent by the second solver, and that the second solver receives the first local prediction by the first solver. Position and/or velocity data transfer occurs between computing resources to which each solver is attached. Data transfer can be supported by shared memory mechanism or by a message passing mechanism, depending of the physical architecture of computing resources.

Next, at step S40, each solver combines the received prediction with its own local prediction of the common frontier data in order to obtain a global negotiated common frontier prediction data. The combination is performed as known in the art, e.g. an average position of the nodes is computed from the local and received predicted positions. It is to be understood that the global negotiated common frontier prediction data is the same for both the first and second solvers.

Then, at step S50, each solver computes a corrective force to be applied on each node forming the common frontier: the common frontier to be reached for next time-step T←T+Δt of simulation is obtained. The corrective force is computed from current local common frontier data and the global negotiated common frontier prediction data.

Next, at step S60, each solver inputs its computed corrective force to the common frontier and gets a new current common frontier data. The corrective forces are thus imposed on the common frontier nodes. This can be performed using adapted solver's API.

Then, at step S70, the clock simulation is incremented and a new simulation cycle can start at step S10.

The preferred embodiment of the present invention has been described. It will be understood that various modifications may be made without departing from the spirit and scope of the invention. Therefore, other implementations are within the scope of the following claims. The maintaining step may comprise maintaining three or more fabric pieces tight by computing a common frontier by the solvers that simulated the three or more fabric pieces. Hence, three or more fabric pieces are part of the seam.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for simulating an assembly of fabric pieces comprising the steps of:
    simulating, by a first solver, at least one first fabric piece of the assembly for a given time of the simulation and simulating, by a second solver, at least one second fabric piece of the assembly for the given time of the simulation, the first and second solver implemented in respective computing resources provided by one or more hardware processors, wherein the first fabric piece and second fabric piece share a local common frontier, the local common frontier being a plurality of paired nodes from both the first fabric piece and second fabric piece; and maintaining the first and the second fabric pieces tight by:

mutually exchanging, from and to the first and second solver, respective current positions of the positions and velocities of the paired nodes of the local common frontier;

mutually agreeing, by the first and second solvers, on a common position target for each of the paired nodes of the common frontier;

calculating, at the first solver, a corrective force to apply to each of the paired nodes of the first fabric piece such that each paired node of the first fabric piece is at its respective common position target at a next time step of the simulation;

calculating, at the second solver, a corrective force to apply to each of the paired nodes of the second fabric piece such that each paired node of the second fabric piece is at its respective common position target at the next time step of the simulation; and displaying a real-time representation of the assembly of fabric pieces with the first and second fabric pieces maintained tight.

2. The computer-implemented method of claim 1, wherein the computation of the common frontier is performed by combining data of the first fabric piece and data of the second fabric piece.

3. The computer-implemented method of claim 2, wherein the combination of data of the first fabric piece and the second fabric piece is performed by mutually exchanging data between the first solver and the second solver.

4. The computer-implemented method of claim 3, wherein the mutual exchange of data between the first solver and the second solver comprises:

the first solver computes a first local prediction of common frontier data from current common frontier data, and sends the result of the computation to the second solver;

the second solver computes a second local prediction of common frontier data from current common frontier data, and sends the result of the computation to the first solver;

the first solver receives the second local prediction sent by the second solver;

the second solver receives the first local prediction sent by the first solver;

the first solver combines the first local prediction of the common frontier data with the received second local prediction of the common frontier data, the result of the combination being a global common frontier prediction data;

the second solver combines the second local prediction of the common frontier data with the received first local prediction of the common frontier data, the result of the combination being the global common frontier prediction data;

the first solver computes a first corrective force to apply on common frontier, the first corrective force being computed from current local common frontier data and the global common frontier prediction data; and the second solver computes a second corrective force to apply on common frontier, the second corrective force being computed from current local common frontier data and the global common frontier prediction data.

5. The computer-implemented method of claim 4, further comprising:

the first solver inputs the computed first corrective force to the common frontier and obtains a new current common frontier data; and the second solver inputs the computed second corrective force to the common frontier and obtains a new current common frontier data.

6. The computer-implemented method of claim 4, wherein the steps of combining a local prediction of the common frontier data with a received local prediction of the common frontier data is performed by averaging values representing the local prediction with values representing received local prediction.

7. The computer-implemented method of claim 4, wherein the at least one first and second fabric pieces are modeled by surfaces meshes comprising nodes.

8. The computer-implemented method of claim 7, wherein the common frontier data include at least one of the position and/or the velocity of the nodes of the first and second fabric pieces that are part of the common frontier between the at least one first and second fabric pieces.

9. The computer-implemented method of one of claim 1, wherein the first solver is dedicated to a first type of fabric piece and the second solver is dedicated to a second type of fabric piece.

10. The method of claim 1, further comprising outputting a three-dimensional modeled object based on the maintained first and second fabric pieces.

11. The method of claim 10, further comprising storing the three-dimensional modeled object in a data file.

12. A computer program product comprising:

a non-transitory computer readable storage medium embodying program code for simulating an assembly of fabric pieces; and the program code including computer instructions for execution by a computer, the instructions comprising means for performing the steps of:

simulating, by a first solver, at least one first fabric piece of the assembly for a given time of the simulation and simulating, by a second solver simulating at least one second fabric piece of the assembly for the given time of the simulation, the first and second solver implemented in respective computing resources provided by one or more hardware processors, wherein the first fabric piece and second fabric piece share a local common frontier, the local common frontier being a plurality of paired nodes from both the first fabric piece and second fabric piece; and maintaining the first and the second fabric pieces tight by mutually exchanging, from and to the first and second solver, respective current positions of the positions and velocities of the paired nodes of the local common frontier;

mutually agreeing, by the first and second solvers, on a common position target for each of the paired nodes of the common frontier;

calculating, at the first solver, a corrective force to apply to each of the paired nodes of the first fabric piece such that each paired node of the first fabric piece is at its respective common position target at a next time step of the simulation;

calculating, at the second solver, a corrective force to apply to each of the paired nodes of the second fabric piece such that each paired node of the second fabric piece is at its respective common position target at the next time step of the simulation; and displaying a real-time representation of the assembly of fabric pieces with the first and second fabric pieces maintained tight.

13. A computer system for simulating an assembly of fabric pieces, comprising:

a processor coupled to a memory;

a graphical user interface configured to display simulation of the assembly of fabric pieces; and the memory having recorded thereon program instructions configuring the processor to:

simulating, by a first solver, at least one first fabric piece of the assembly for a given time of the simulation and simulating, by a second solver simulating at least one second fabric piece of the assembly for the given time of the simulation, the first and second solver implemented in respective computing resources provided by one or more hardware processors, wherein the first fabric piece and second fabric piece share a local common frontier, the local common frontier being a plurality of paired nodes from both the first fabric piece and second fabric piece; and maintain the first and the second fabric pieces tight by mutually exchanging, from and to the first and second solver, respective current positions of the positions and velocities of the paired nodes of the local common frontier;

mutually agree, by the first and second solvers, on a common position target for each of the paired nodes of the common frontier;

calculate, at the first solver, a corrective force to apply to each of the paired nodes of the first fabric piece such that each paired node of the first fabric piece is at its respective common position target at a next time step of the simulation;

calculate, at the second solver, a corrective force to apply to each of the paired nodes of the second fabric piece such that each paired node of the second fabric piece is at its respective common position target at the next time step of the simulation, and display, at the graphical user interface, a real-time representation of the assembly of fabric pieces with the first and second fabric pieces maintained tight.

14. A computer system as claimed in claim 13 wherein the processor computes the common frontier by combining data of the first fabric piece and data of the second fabric piece.

15. The computer system of claim 14, wherein the processor combines data of the first fabric piece and the second fabric piece by mutually exchanging data between the first solver and the second solver.

16. The computer system of claim 15, wherein the mutual exchange of data between the first solver and the second solver comprises:

the first solver computes a first local prediction of common frontier data from current common frontier data, and sends the result of the computation to the second solver;

the second solver computes a second local prediction of common frontier data from current common frontier data, and sends the result of the computation to the first solver;

the first solver receives the second local prediction sent by the second solver;

the second solver receives the first local prediction sent by the first solver;

the first solver combines the first local prediction of the common frontier data with the received second local prediction of the common frontier data, the result of the combination being a global common frontier prediction data;

the second solver combines the second local prediction of the common frontier data with the received first local prediction of the common frontier data, the result of the combination being the global common frontier prediction data;

the first solver computes a first corrective force to apply on common frontier, the first corrective force being computed from current local common frontier data and the global common frontier prediction data; and the second solver computes a second corrective force to apply on common frontier, the second corrective force being computed from current local common frontier data and the global common frontier prediction data.

17. The computer system of claim 16, further comprising:

the first solver inputs the computed first corrective force to the common frontier and obtains a new current common frontier data; and the second solver inputs the computed second corrective force to the common frontier and obtains a new current common frontier data.

18. The computer system of claim 16, wherein the combining of a local prediction of the common frontier data with a received local prediction of the common frontier data is performed by averaging values representative of the local prediction with values representative of received local prediction.

19. The computer system of claim 16, wherein the at least one first and second fabric pieces are modeled by surfaces meshes comprising nodes.

20. The computer system as claimed in claim 13 wherein the first solver is dedicated to a first type of fabric piece and the second solver is dedicated to a second type of fabric piece.

* * * * *